United States Patent
Kessler et al.

(10) Patent No.: US 8,762,265 B2
(45) Date of Patent: Jun. 24, 2014

(54) METHOD FOR COLLECTING AND DISBURSING ELECTRONIC GRATUITIES

(71) Applicants: Ryder Kessler, New York, NY (US); Judd Kessler, New York, NY (US); Jordan Bar Am, Hoboken, NJ (US)

(72) Inventors: Ryder Kessler, New York, NY (US); Judd Kessler, New York, NY (US); Jordan Bar Am, Hoboken, NJ (US)

( * ) Notice: Subject to any disclaimer, the term of this patent is extended or adjusted under 35 U.S.C. 154(b) by 0 days.

(21) Appl. No.: 13/659,690

(22) Filed: Oct. 24, 2012

(65) Prior Publication Data

US 2013/0103579 A1    Apr. 25, 2013

Related U.S. Application Data

(60) Provisional application No. 61/551,137, filed on Oct. 25, 2011.

(51) Int. Cl.
  *G06Q 40/00*   (2012.01)
  *G08B 13/14*   (2006.01)
  *G06K 5/00*    (2006.01)

(52) U.S. Cl.
  USPC ............... 705/39; 705/35; 235/382; 340/571

(58) Field of Classification Search
  USPC .............................. 235/382; 705/35; 340/571
  See application file for complete search history.

(56) References Cited

U.S. PATENT DOCUMENTS

| | | | |
|---|---|---|---|
| 6,850,767 B1 * | 2/2005 | Maxymych | 455/461 |
| 7,533,809 B1 * | 5/2009 | Robinson et al. | 235/382 |
| 2006/0085265 A1 * | 4/2006 | Dietz et al. | 705/15 |
| 2008/0065396 A1 | 3/2008 | Marshall | |
| 2008/0195533 A1 | 8/2008 | Harkins et al. | |
| 2009/0171841 A1 * | 7/2009 | Blythe | 705/41 |
| 2009/0283587 A1 | 11/2009 | Dibello | |
| 2010/0217699 A1 * | 8/2010 | Bookstaff | 705/35 |
| 2010/0306086 A1 | 12/2010 | Fox Davies | |
| 2011/0093941 A1 * | 4/2011 | Liu et al. | 726/7 |
| 2012/0130887 A1 * | 5/2012 | Meckling | 705/39 |

OTHER PUBLICATIONS

Google Search results for electronic tip jar Oct. 4, 2013.*

* cited by examiner

*Primary Examiner* — William Rankins
(74) *Attorney, Agent, or Firm* — Cooper & Dunham LLP

(57) ABSTRACT

The present invention relates to systems and methods for collecting and disbursing electronic gratuities. According to one embodiment, a device for submitting gratuities by credit card is provided at a place of business or other appropriate location. A method of using this device is disclosed, whereby consumers pay a predetermined or adjustable gratuity amount by inserting a credit card into the device. According to another embodiment, technological infrastructure is provided to transmit encrypted payment information such that the acquiring bank of the device provider obtains authorization for gratuity transactions conducted using the device. The acquiring bank is thus enabled to credit the device provider's merchant account or disbursal accounts with electronic gratuity payments less acquisition fees. According to another embodiment, a method of disbursing gratuity shares to employees of the business is provided, wherein processing fees are collected by the device provider.

25 Claims, 3 Drawing Sheets

METHOD FOR COLLECTING AND DISBURSING ELECTRONIC GRATUITIES

FIELD OF THE INVENTION

The present invention relates to a system and method for collecting and disbursing electronic gratuities. According to an embodiment, the present invention may be used in environments such as retail locations, with tips disbursed to service workers based on shifts of work; other service environments such as salons or valets, with tips left for specific employees; and charities, with collections going to one central recipient.

In one aspect, the invention includes a device for submitting gratuities by credit card that is provided at an appropriate location, such as a business or charity solicitation point. The invention provides a way for consumers to easily and conveniently submit gratuities of a predetermined amount without handling cash, signing a draft or even communicating with an employee of the business. Secure credit card transactions are mediated by the acquiring bank of the device provider and the card-issuing bank, and electronic gratuities may be ultimately deposited in the business's or employees' bank accounts less any processing fees that may be debited by the device provider. An on-line interface is also provided to enable the business or employees to track gratuity transactions and manage disbursement of gratuity deposits.

BACKGROUND OF INVENTION

Tip jars are an essential means for compensating workers in many different industries. Tips boost company morale, supplement workers' wages, and give customers a channel through which to show their appreciation for good service. For service-orientated companies—companies for which tipping is a central aspect of the customer's daily experience—employees are the face of the company to customers and almost completely dictate customer satisfaction. Over the past 15 years, tip jars have found their way onto the counters of many establishments that customarily would not have solicited tips from their customers including coffee shops, delis, fast food restaurants, retail stores and other for-profit businesses and non-profit organizations. Additionally, cash collection receptacles resembling tip jars in form and function are also widely used by charitable organizations that solicit small donation amounts from passers-by.

Meanwhile, credit card companies have ceased requiring signatures on purchases under $25, and consumers have become increasingly comfortable swiping on the go. In fact, billions of dollars are spent on products and services costing $25 or less, such as fast food, magazines, manicures, etc. As credit cards have become the standard method of payment for even the smallest and most casual purchases, the technology used for small cash gratuities has not kept up with the payment technology in consumers' pockets. With less spare change and small bills on hand, consumers have no easy way to leave gratuities to counter retail employees; tips to hospitality, salon, or valet employees; and donations to charities or cultural institutions that solicit from pedestrians, among others.

Increased use of credit cards for small purchases alongside increased reliance on tip jars to incentivize and compensate service workers reveals a distressing picture. Together, these trends mean billions of dollars of uncollected tips—tips customers would likely leave if tipping technology caught up to payment technology—tips that could be going into workers' pockets and, ultimately, into the economy overall. Accordingly, there is a need for a technological innovation that allows consumers to perform small gratuity transactions with credit and debit cards.

SUMMARY OF INVENTION

The present invention meets the long-felt need for seamless electronic gratuity technology. The invention is embodied in part by a system including a credit or debit card-reading device, hereinafter referred to as an Electronic Gratuity Device ("EGD"), wherein the "Gratuity" may be a tip, charitable donation or any similar monetary gift that is not a payment for goods or services. The EGD utilizes an electronic banking infrastructure for authorization, execution and tracking of transactions initiated as it reads consumers' cards. The EGD may be located at a point of sale or point of service of a business or non-profit organization. The organization whose employees or volunteers are soliciting gratuities will be referred to as the EGD contractor. The invention also provides methods of use and operation for the EGD system.

In one embodiment, the invention provides a system for collecting and disbursing electronic gratuities comprising a server configured to store, organize and transmit information relating to one or more gratuity transactions, and an electronic gratuity device configured to collect and transmit gratuity transaction information to the server.

In another embodiment, the invention provides a method of collecting and disbursing electronic gratuities comprising the steps of:
 a. providing access to a server configured to store, organize and transmit gratuity transaction information,
 b. providing an electronic gratuity device configured to collect and transmit gratuity transaction information to the server, and
 c. electronically linking the server to an acquiring processor, wherein the acquiring processor is linked to a card-issuing bank, the card-issuing bank is linked to a receiving account such that gratuity transactions conducted using the device are processed, and gratuity funds are deposited in the receiving account.

In yet another embodiment, the invention provides a method of collecting and disbursing electronic gratuities comprising the steps of:
 a. providing access to a server configured to store, organize and transmit gratuity transaction information,
 b. providing an electronic gratuity device configured to collect and transmit gratuity transaction information to the server, and
 c. providing a prepaid debit card, wherein using the prepaid debit card with the electronic gratuity device generates gratuity transaction information.

The invention also provides a device used in accordance with either or both of the methods described above.

DETAILED DESCRIPTION OF THE INVENTION

The present invention provides a method of collecting electronic gratuities and a system used to implement this method.

Figure 1:
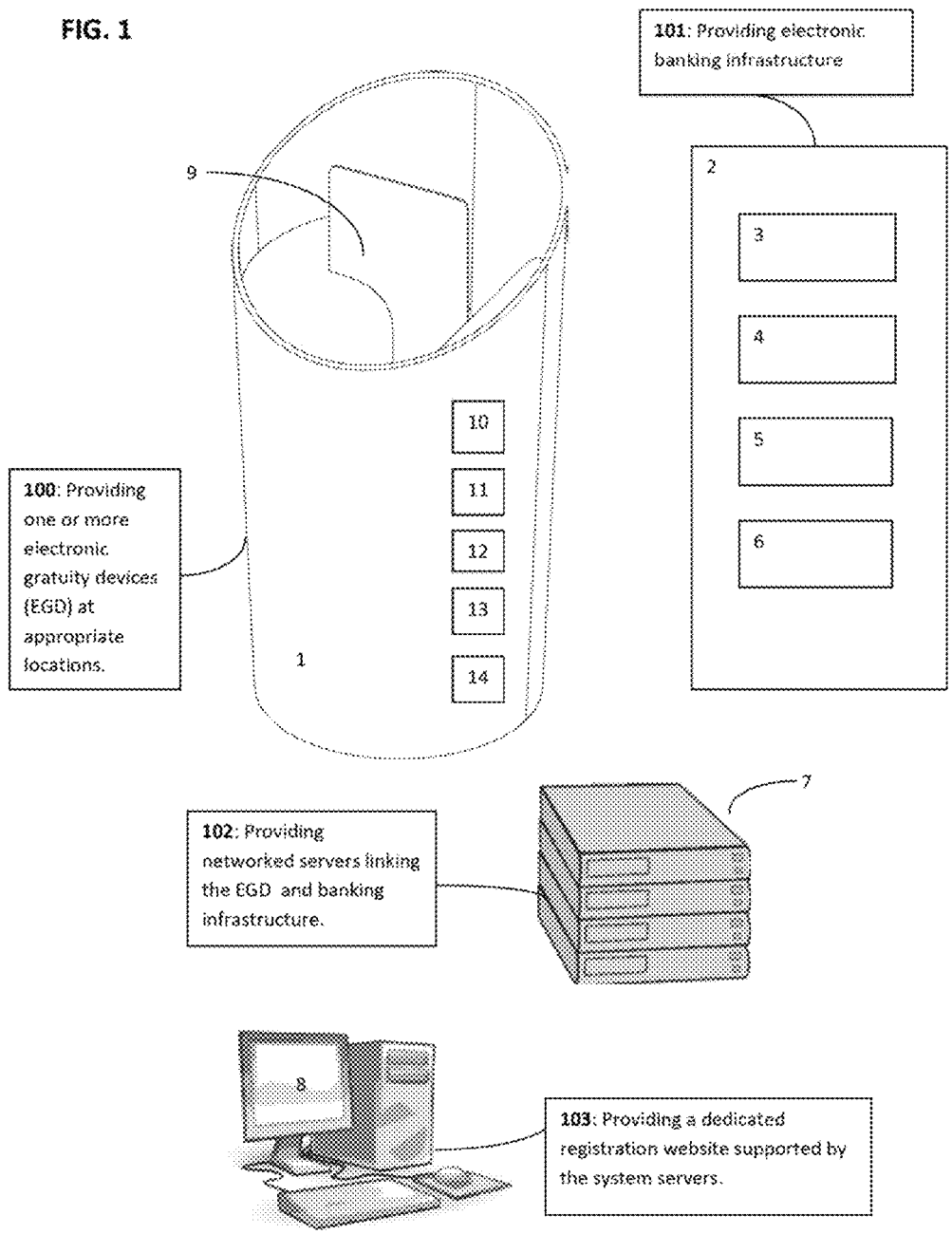
FIG. 1 is a diagrammatic illustration of an integrated system and method of establishing the system according to an embodiment of the invention.

FIG. 1 shows an overall, integrated system and method for collecting and disbursing gratuities according to one embodiment of the present invention. The method of FIG. 1 includes providing one or more EGD 1 (step 100) at appropriate locations, and providing the electronic banking infrastructure 2 (step 101) necessary for processing credit or debit card transactions using the EGD. According to this embodiment, the banking infrastructure may include a card-issuing bank 3, an acquiring processor 5 and the EGD provider's bank account 4—i.e., a receiving account. It may also include the EGD contractor's bank and/or affiliated employees' accounts 6—i.e., a disbursal account.

The method of establishing an EGD system may include providing at least one server 7 (step 102) and a website 8 (step 103). Servers store transaction information and EGD account information needed for proper management of funds collected at EGD locations. System servers 7 also support the web interfaces 8 which the EGD provider, EGD contractor and gratuity-collecting employees use to manage funds collected at EGD locations.

EGD Design Specifications

The EGD is a card-reading device 1 located a point of sale within a business or other appropriate location. It is able to process gratuity transactions, which are one-step payments at a pre-set or adjustable amount—e.g., 50 cents, $1.00, or even up to the maximum chargeable without providing a signature—from customers or other givers who choose to leave a gratuity by credit or debit card. In one preferred embodiment of the invention, the EGD possesses a card slot 9 for insertion of standard-size credit and debit cards having magnetic stripes. In other embodiments, the EGD may be configured to accept payments made by card swiping or touch-and-go card waving. In still other embodiments, the EGD may be configured to accept payments using mobile phones and other payment platforms, such as near field communication, quick response matrix codes, barcode scanning, and/or radio frequency identification.

The EGD may be electrically powered via an AC power cord 10. According to another embodiment, the EGD may also be powered by inserted batteries or an integral rechargeable battery. The body of the EGD may display a gratuity amount. In one embodiment the EGD may have a control panel 11 including a display, touchscreen, buttons and/or dials that permit users to adjust numerous EGD functions. In one embodiment, the EGD may be provided with a plurality of buttons, whereby touching or depressing a given button sets the gratuity payment amount at a particular monetary unit, e.g., $1.00-, $2.00-, and $3.00-buttons. In yet another embodiment, the control panel 11 may include a microphone and associated hardware and software for receiving voice commands. The functions of the control panel 11 include power controls, setting gratuity payment amount, word or image display, and sound making. Any combination of the functions and settings of the device may also be predetermined by the EGD provider.

Power settings may include on, off and powersave modes that are indicated by visual markers on the body of the device. The device may also include an adjustable sound component 12 that may be activated each time payment information is successfully read from a credit card. Users may also set the EGD to display one or more of the following: instructions for use, a pre-set gratuity amount, a graphical or textual message soliciting gratuities, and/or the amount of gratuities deposited during a given period. For example, the EGD may be configured such that every time a customer dips his or her card, the EGD emits the sound of coins clinking against glass, while a rising thermometer graphic indicates that the EGD contractor and/or employees are approaching their gratuity goal for the day.

The EGD comprises a memory 13, which may be used for reading and saving transaction information from a series of gratuity transactions, as well as saving time and employee shift information. According to one embodiment, EGDs may be identified by a location- and device-specific code. Each one further comprises a transmission mechanism 14, such as a wired or wireless Internet connection, for sending encrypted payment, time, employee shift and location information to servers maintained by the EGD provider. After transmission, any type of saved information may be deleted from the memory. The process by which gratuities are collected from consumers' credit or debit card accounts and disbursed to employees or other receiving parties will be discussed in detail in sections that follow.

EGD Website Registration

Figure 2:
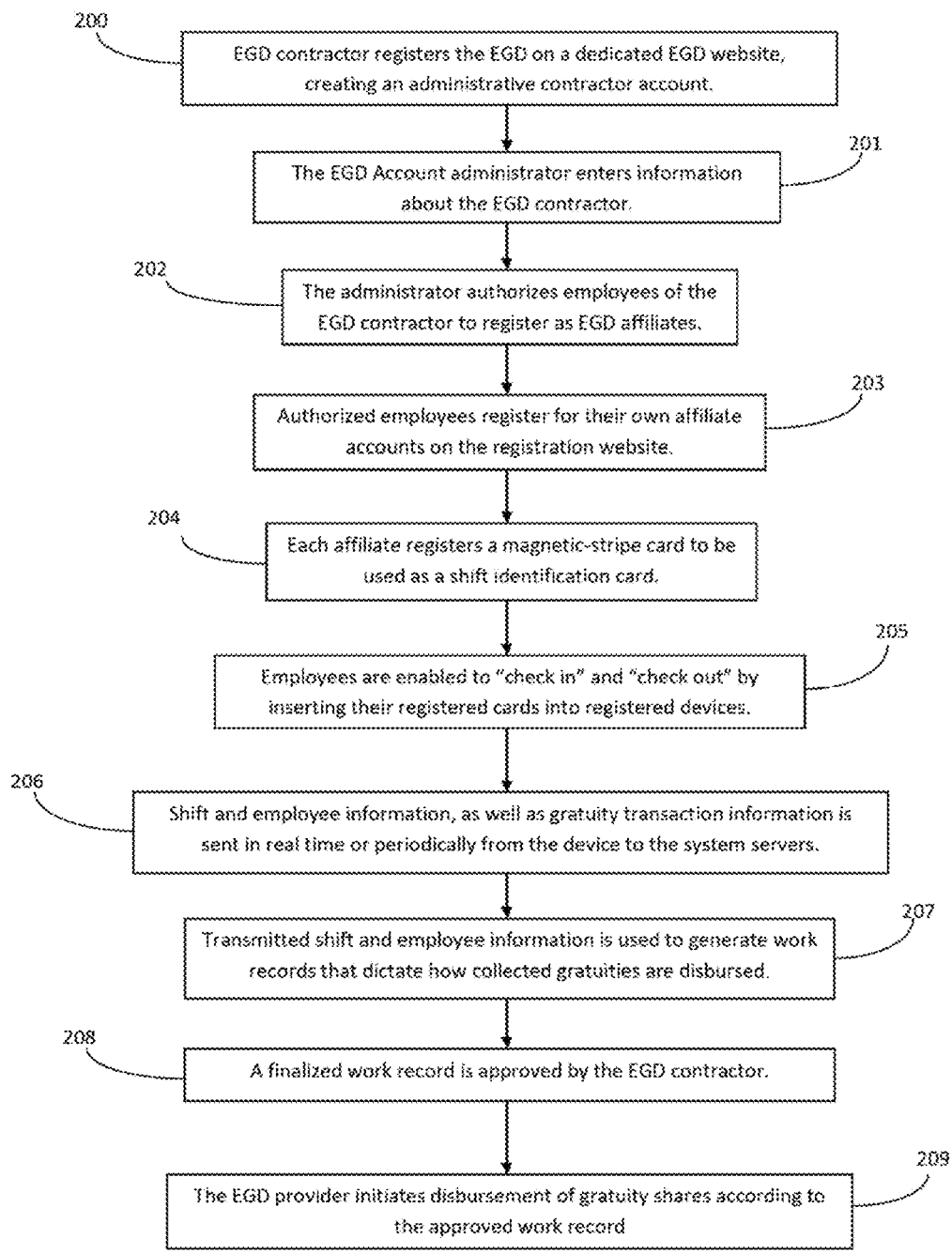
FIG. 2 is a flow chart illustrating a method for EGD contractor and employee registration according to an embodiment of the invention.

According to an embodiment, an EGD contractor may form an agreement with the EGD provider. The agreement may include terms such as the fee structure for EGD usage, EGD unit rental, and mode of funds disbursal, including employee remuneration. FIG. 2 is a flow chart illustrating a process for EGD contractor and employee registration according to one embodiment. Upon forming the agreement or receiving the EGD, the EGD contractor or its agent can register the device on a dedicated EGD website, thereby creating an administrative contractor account and tethering it to a collection location 200.

Using the user interface of the website, the account administrator may enter information about the EGD contractor's identity 201—i.e., whether it is a retail store with employees or a charitable organization soliciting donations—that will be used to produce payment schedules that dictate how collected gratuities should be periodically disbursed. For example, an administrator may enter a "minimum shift length" value, such that if an employee neglects to check out at the end of a shift, a nominal value will be assigned for the length of the uncompleted shift to aid in determining how that employee's share of gratuities is calculated.

According to an embodiment, administrators can invite employees at their locations to register as EGD affiliates 202. Affiliates may be able to register for their own affiliate accounts on the EGD registration website 203. Registration may involve providing personal information such as name, address, cellular phone number, banking information, and/or other identifying information, so that the EGD provider can send the employee account balance updates and other information. The contractor and affiliate account information is stored on servers, or other means for information storage, that constitute an aspect of the inventive system.

According to an aspect of the present invention, registration may also involve registering an identification element 204, to be used as a shift identification means. The shift identification means may use any technology available as a payment acceptance means, and, in a preferred embodiment, the shift identification means and the payment acceptance means may be comprised by a single component of the EGD.

According to one embodiment of the invention, the identification element may be a debit or credit card owned by the Employee, or a card issued by the EGD provider. Employees can "check in" and "check out" by inserting the card into the EGD or EGDs they are affiliated with 205, which causes the device to transmit card information, device location information and time information to the server 206. In this way, employees can be allotted an appropriate portion of the tips collected at affiliated units. Where the registered card is a reloadable card issued by the EGD provider, the card may also be loaded with the employee's share of tips from a previous payment cycle. Alternatively, the card may provide log-in information for a Paypal®-type account that is automatically updated with the employee's calculated shares each payment cycle.

Collection of Gratuity Deposits

When the registered EGD has been installed at the location, and the EGD contractor and employees working at the location have been properly registered as explained above, the EGD may be used for the collection of electronic gratuities.

According to an embodiment, with the EGD in the "on" powermode, and set to the display, sound and gratuity value preferences of the contractor or presets of the EGD provider, an affiliated employee will cause the EGD to recognize a registered identification element. In a preferred embodiment, the employee may accomplish this step by inserting his or her registered card into the EGD to create a record of shift start-time and employee identity 205. During the shift period, customers or other givers who wish to give an electronic gratuity may do so. The mechanism by which customers' and/or givers' credit accounts are charged will be explained in detail below. The conclusion of a shift may be indicated by the first employee reinserting their affiliate card, or by a second employee inserting a second affiliate card to begin a second shift. Where the shift length as indicated by the recognition of a second employee's identification element is greater than a predetermined maximum value, a nominal shift length value will be assigned to the first employee's shift. In an alternative embodiment, one or more employees may check in without automatically checking out a first employee, such that multiple employees' shifts may overlap.

Shift and employee information, as well as gratuity transaction information may be sent either in real time or periodically to the system servers 206. The shift and employee information is used to generate work records that may dictate how shares of collected gratuity deposits are disbursed 207. EGD contractors and employees may have the option of reviewing and modifying the generated records, or of submitting determined gratuity disbursal plans on a periodic basis, rather than requiring employees to check in and out at the EGD device. According to the terms of the EGD contractor's agreement, there may be a pre-determined payment cycle period (e.g., two weeks), such that after every payment cycle, a finalized work record (either reviewed or unedited) is created or recorded for purposes of disbursement and record-keeping 208. After the electronic work record, or disbursal document, is created, the EGD provider initiates disbursement of gratuity shares according the shift information recorded in the document, or according to another appropriate metric embodied in the EGD contractor agreement 209.

Figure 3:
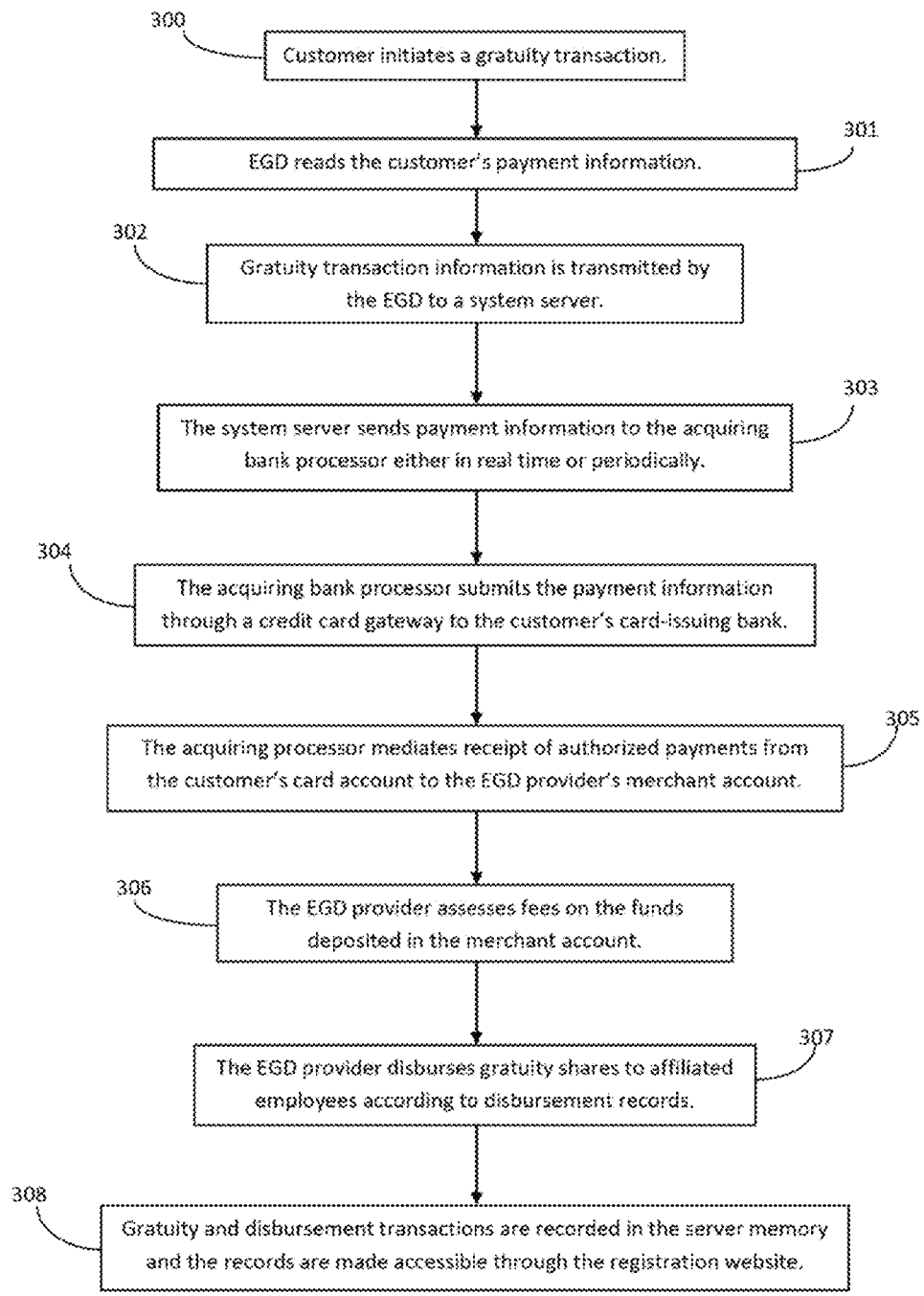
FIG. 3 is a flow chart illustrating a method for processing EGD transactions according to an embodiment of the invention.

FIG. 3 illustrates a method of processing gratuity transactions. Each time a customer or other giver initiates a gratuity transaction 300, for example by dipping a credit card into the EGD, the EGD reads the customer's payment information 301, and submits credit card payment information for a predetermined amount to the EGD server 302. The device's memory is capable of storing transaction information, but in a preferred embodiment of the invention, the EGO does not store any transmitted transaction information. Accordingly, the information storage means, such as the server or servers, receive credit card payment information from any linked and active devices as transactions occur. Relevant information is organized, and may be made available on the website.

In one embodiment of the invention, a server sends the payment information to the acquiring bank processor 303. The server may send payment information instantaneously, or it may store payment information for a period and send batched payment information collections. The period for batching may be predetermined. Alternatively, the server may send payment information for a unique customer only after the customer initiates a certain minimum number of EGD transactions.

The acquiring bank processor submits the payment information through a credit card gateway to the card-issuing bank of the customer 304, thus creating an authorized payment. The acquiring bank mediates receipt of authorized payments from the consumers' card accounts. Once processed, the payments less acquisition fees may be sent to the EGO provider's merchant bank account 305. The EGD provider may assess fees on the gratuity payments collected in the merchant bank account according to a standard practice or to the EGD contractor agreement 306. These EGD processing fees may be removed to a separate account owned by the provider. The remaining funds are available for disbursement to EGD contractors, or directly to affiliated employees. In yet another embodiment of the invention, funds may be disbursed directly from the acquiring bank to the disbursement account or accounts of the EGD contractor or employees, such that only EGD processing fees are deposited into the EGD provider's account. Accordingly, the EGD provider's merchant account, EGD contractors' accounts and disbursal accounts may be considered receiving accounts of gratuity funds.

In another embodiment, the customer or other giver may initiate a gratuity transaction 300 by dipping a pre-paid debit card or gift card into the EGD. In this embodiment, the balance of pre-paid card gratuity funds may be managed by the EGD provider, EGD contractor or a designated third party.

Disbursement of Collected Gratuities

Where an EGD contractor has arranged for the generation of work schedules, either from contractor records, from registration card check in/check out, or other means as explained above, the EGD provider will access the schedules and submit gratuity shares according to employees' work records and/or another agreed upon metric 307. The gratuity shares may be deposited in employees' bank by direct deposit or into Paypal®-type accounts, or onto their registered cards. Where appropriate, the collected and processed EGD funds may be deposited into an account controlled by the EGD contractor itself, such as in the case of a charitable or non-profit organization. All transactions may be recorded and saved in the system server memory 308, and such records are accessible through the registration website by contractors and affiliated employees according to their level of authorization.

Thus, there has been shown and described a method and system for collecting and disbursing electronic gratuities. The method and system are not limited to any particular hardware or software configuration. The many variations, modifications and alternative applications of the invention that would be apparent to those skilled in the art, and that do not depart from the scope of the invention are deemed to be covered by the invention.

We claim:

1. A method of collecting and disbursing electronic gratuities comprising the steps of:
providing access to a server configured to store, organize and transmit gratuity transaction information; providing an electronic gratuity device configured to collect and transmit gratuity transaction information to the server;
electronically linking the server to an acquiring processor, wherein the acquiring processor is linked to a card-issuing bank, the card-issuing bank is linked to a receiving account such that gratuity transactions conducted using the device are processed, and gratuity funds are deposited in the receiving account; and determining a disbursal amount of the gratuity funds by assessing fees against the gratuity funds deposited in the receiving account.

2. The method according to claim 1, further comprising the steps of:

disbursing the disbursal amount of the gratuity funds to a disbursal account; and retaining the assessed fees in the receiving account.

3. The method according to claim 2, further comprising providing a registration website for registering the electronic gratuity device and a gratuity-collecting entity, wherein the disbursal account is associated with the gratuity-collecting entity.

4. The method according to claim 2, further comprising providing a registration website for registering the electronic gratuity device and a gratuity-collecting individual associated with the disbursal account, maintaining an electronic work record for said gratuity-collecting individual on the registration website; and using the electronic work record to determine the value of gratuity funds to be disbursed to the disbursal account.

5. The method according to claim 4, wherein registering the gratuity-collecting individual comprises providing personal information, said personal information comprising name, address and phone number information.

6. The method according to claim 5, wherein registering the gratuity-collecting individual further comprises providing banking information.

7. The method according to claim 5, wherein registering the gratuity-collecting individual further comprises registering a reloadable debit card.

8. The method according to claim 4, wherein the electronic work record is updated when the registered electronic gratuity device recognizes an identification element.

9. The method according to claim 8, wherein the identification element is a card having a magnetic stripe.

10. The method according to claim 1, wherein at least one of the gratuity transactions conducted using the device is of a predetermined amount.

11. The method according to claim 10, further comprising the step of displaying the predetermined amount on the electronic gratuity device.

12. The method according to claim 1, further comprising providing a plurality of buttons on the electronic gratuity device, wherein each of the plurality of buttons corresponds to a particular monetary unit, and at least one of the gratuity transactions conducted using the device is of an adjustable amount set by touching or depressing one of the plurality of buttons.

13. The method according to claim 1, further comprising the step of displaying an amount of gratuities deposited during a given period on the electronic gratuity device.

14. The method according to claim 10, wherein a giver initiates one of the at least one of the gratuity transactions by performing a single action consisting of dipping a credit card into the electronic gratuity device.

15. The method according to claim 10, wherein a giver initiates one of the at least one of the gratuity transactions by performing a single action consisting of dipping a pre-paid debit card or gift card into the electronic gratuity device.

16. The method according to claim 4, wherein the electronic work record of a first registered gratuity-collecting individual is updated with a shift start-time when the registered electronic gratuity device recognizes an initial presentation of an identification element of the first registered gratuity-collecting individual.

17. The method according to claim 16, wherein the electronic work record of the first registered gratuity-collecting individual is updated with a shift end-time when the registered electronic gratuity device recognizes a subsequent presentation of the identification element of the first registered gratuity-collecting individual.

18. The method according to claim 16, wherein the electronic work record of the first registered gratuity-collecting individual is updated with a shift end-time when the registered electronic gratuity device recognizes an initial presentation of an identification element of a second registered gratuity-collecting individual.

19. The method according to claim 18, wherein the shift end-time is selected to be the earlier of a time at which the registered electronic gratuity device recognizes the initial presentation of the identification element of the second registered gratuity-collecting individual and a time corresponding to a predetermined maximum shift length value.

20. The method according to claim 16, wherein the electronic work record of a second registered gratuity-collecting individual is updated with a shift start-time when the registered electronic gratuity device recognizes an initial presentation of an identification element of the second registered gratuity-collecting individual, such that the first and the second registered gratuity-collecting individuals' shifts overlap.

21. A method of collecting and disbursing electronic gratuities comprising the steps of:

providing access to a server configured to store, organize and transmit gratuity transaction information; providing an electronic gratuity device configured to collect and transmit gratuity transaction information to the server;

electronically linking the server to an acquiring processor, wherein the acquiring processor is linked to a card-issuing bank, the card-issuing bank is linked to a receiving account such that gratuity transactions conducted using the device are processed, and gratuity funds are deposited in the receiving account; and providing a registration website for registering the electronic gratuity device and a gratuity-collecting entity.

22. The method according to claim 21, wherein registering the gratuity-collecting entity comprises providing entity-identifying information.

23. The method according to claim 21, wherein registering the electronic gratuity device comprises creating an administrative contractor account and providing device location information.

24. A method of collecting and disbursing electronic gratuities comprising the steps of:

providing access to a server configured to store, organize and transmit gratuity transaction information; providing an electronic gratuity device configured to collect and transmit gratuity transaction information to the server; and electronically linking the server to an acquiring processor, wherein the acquiring processor is linked to a card-issuing bank, the card-issuing bank is linked to a receiving account such that gratuity transactions conducted using the device are processed, and gratuity funds are deposited in the receiving account, wherein the gratuity-collecting entity is a charitable organization or a non-profit organization.

25. A method of collecting and disbursing electronic gratuities comprising the steps of:

providing access to a server configured to store, organize and transmit gratuity transaction information;

providing an electronic gratuity device configured to collect and transmit gratuity transaction information to the server; and providing a pre-paid debit card, wherein using the pre-paid debit card with the electronic gratuity device generates gratuity transaction information.

\* \* \* \* \*